Sept. 24, 1968
W. J. ROANTREE
3,402,618
VARIABLE GEARING MECHANISM
Filed April 24, 1967
2 Sheets-Sheet 1
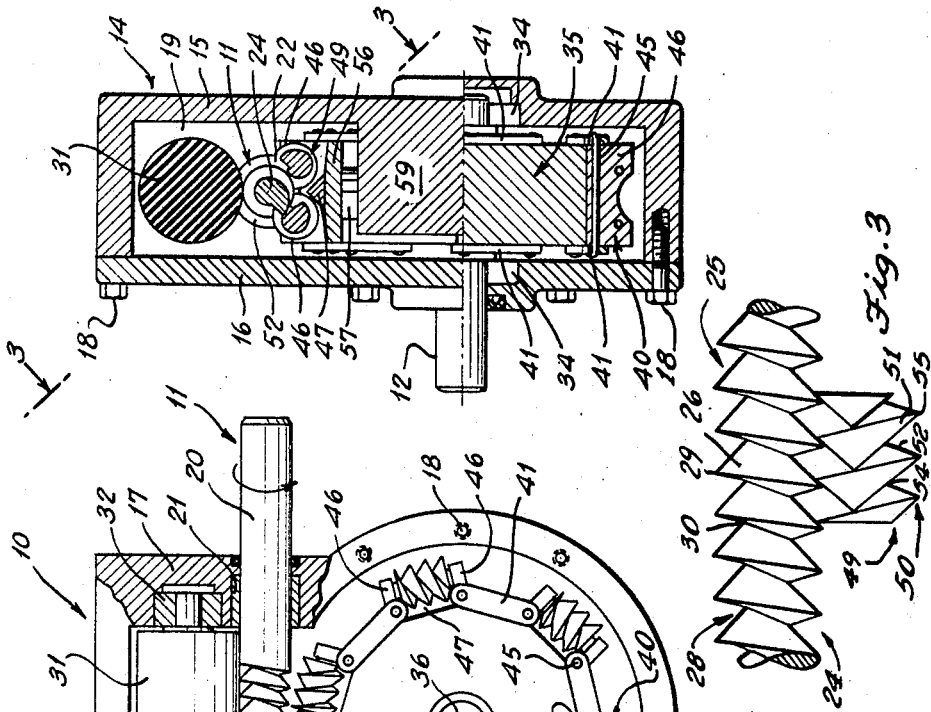
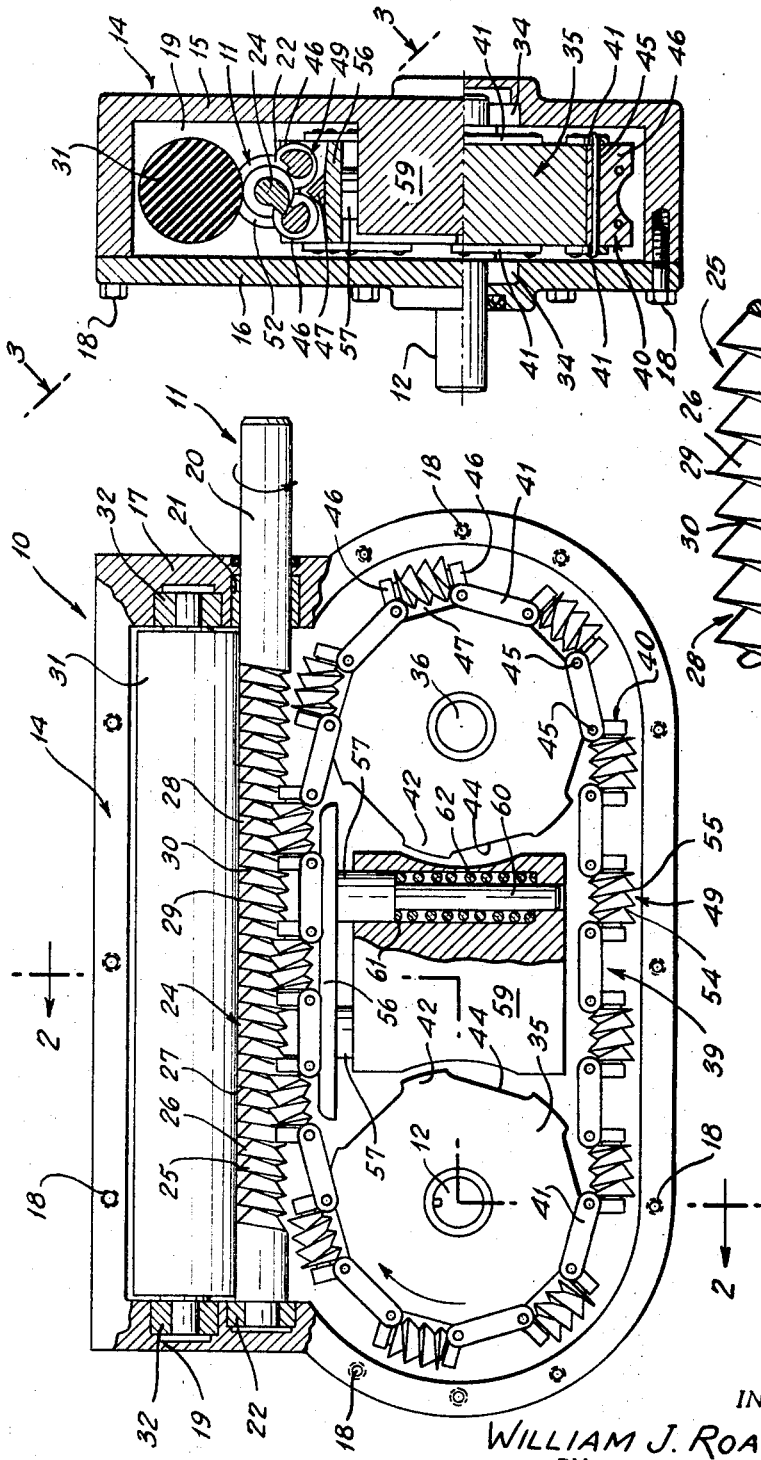
INVENTOR.
WILLIAM J. ROANTREE
BY
Albert M. Parker
ATTORNEY.

Sept. 24, 1968  W. J. ROANTREE  3,402,618
VARIABLE GEARING MECHANISM
Filed April 24, 1967  2 Sheets-Sheet 2
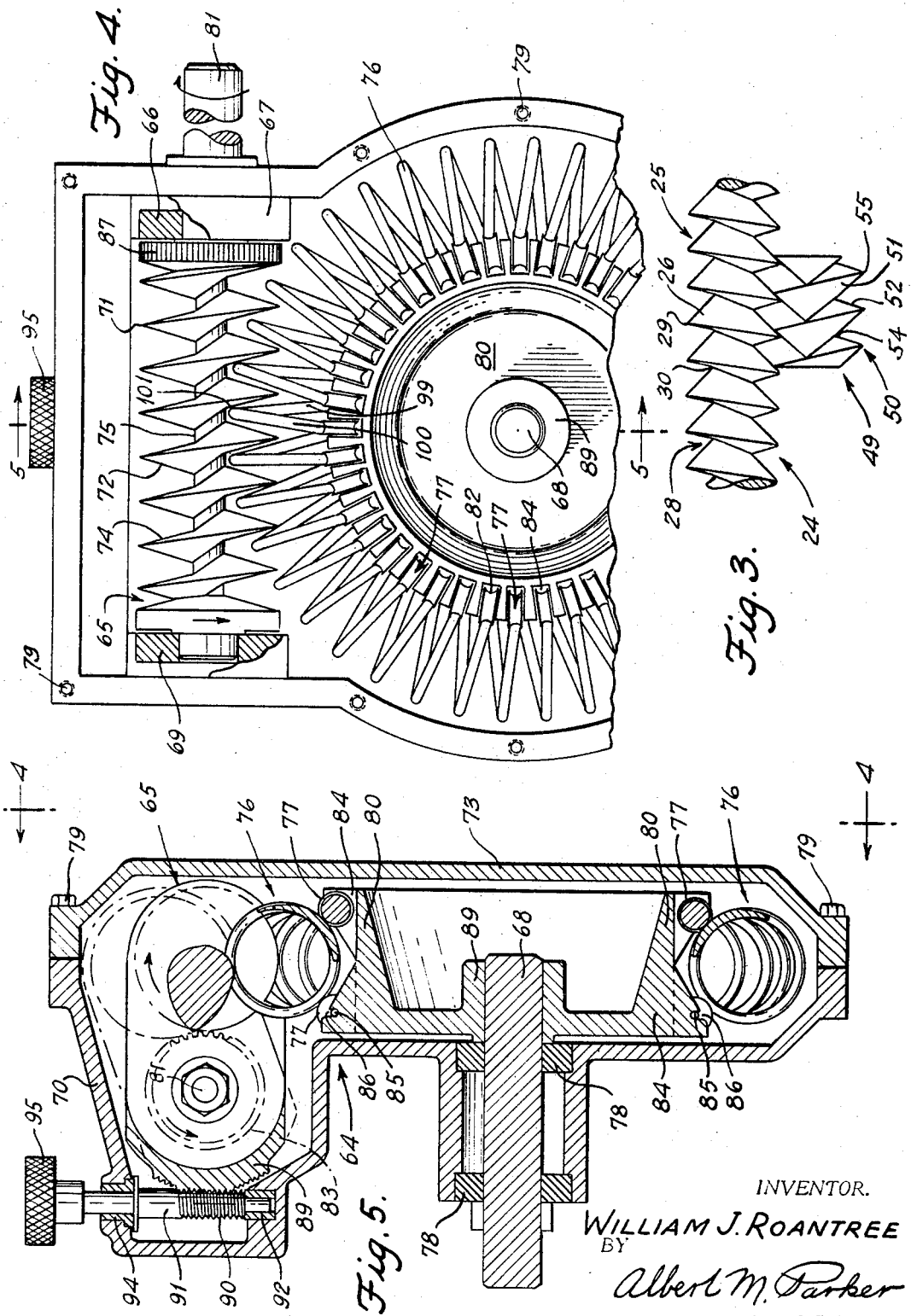
INVENTOR.
WILLIAM J. ROANTREE
BY
Albert M. Parker
ATTORNEY.

United States Patent Office 3,402,618
Patented Sept. 24, 1968

3,402,618
VARIABLE GEARING MECHANISM
William J. Roantree, Port Washington, N.Y., assignor to Roantree Electro-Mech Corporation, Port Washington, N.Y., a corporation of New York
Filed Apr. 24, 1967, Ser. No. 633,064
9 Claims. (Cl. 74—424.7)

ABSTRACT OF THE DISCLOSURE

A variable speed rotary gearing mechanism of the differential type. The mechanism includes a rotatably driven axially fixed lead screw. A member having one or more screw threaded parts rotatable about their axes which mesh with and drivingly engage the thread on the lead screw moves along the lead screw at a speed which is a function of the ratio of the diameters of the zones of driving engagement of the lead screw and the screw threaded part or parts of the member. Means is provided for converting the linear movement of the part or parts of the member longitudinally of the lead screw to rotary movement of an output shaft. The speed of the output shaft is varied either automatically or manually by varying the ratio of the diameters of the lead screw and the screw threaded part or parts at their zone of driving engagement.

Cross-references to related applications

The present application is related to applicant's prior pending application Ser. No. 614,339, filed Feb. 6, 1967, wherein there is disclosed and claimed a differential gearing mechanism for converting rotary to linear motion. The present application is also related to applicant's prior pending application Ser. No. 632,769, filed Apr. 21, 1967, wherein there is disclosed and claimed a variable speed differential gearing mechanism for converting rotary to linear motion.

Background of the invention

*Field of the invention.*—The invention relates to a positive variable speed rotary gearing mechanism which converts rotary motion to rotary motion with an accurately infinitely adjustable speed ratio therebetween.

*Description of the prior art.*—Prior art variable speed rotary motion transmitting mechanisms include those having two pulleys which are connected by a belt of constant length, the pulleys being of such construction and being connected by a linkage such that their effective driving diameters are changed inversely. Since the drive through the mechanism is purely frictional, it is impossible to obtain and maintain an accurate predetermined speed ratio with it. The permissible range of variation of the speed ratio obtainable with such mechanism is also rather limited; to secure a marked reduction in the overall ratio between the speeds of the input and output shafts it is necessary to provide a further speed reducing gearing mechanism connected in series with it, thereby adding to the complication of the mechanism.

The variable gearing mechanism of the present invention in preferred embodiments thereof provides (a) accurate maintenance of a desired output speed, (b) upon adjustment of the mechanism a wide variation in the speed of the output shaft with a given speed of the input shaft of the mechanism, and (c) a high ratio of speed reduction between the speed of rotation of the input shaft and that of the output shaft of the mechanism.

Summary of the invention

The gearing mechanism of the invention changes the speed of rotary motion by a differential action. The mechanism has two main parts, of which the first is a driven elongated screw threaded shaft or lead screw and the second of which includes one or more members which are rotatable about their longitudinal axes and which have screw threads thereon of opposite hand from and of at least substantially the same pitch as the screw thread on the shaft. The screw threaded member or members of the second part are disposed for travel in generally the plane of the axis of the shaft and generally parallel thereto in at least one zone of the shaft, the lands of one of the screw threads on the shaft and said one or more members fitting within and drivingly engaging a portion of the surface defining the helical groove of the other screw thread. The screw threaded shaft is driven. The described travel of the second part of the mechanism, bearing the one or more screw threaded members, is translated into rotary motion to turn an output shaft.

The speed of linear travel of the screw threaded member or members axially of the driven lead screw relative to the rotational speed thereof is expressed by the effective lead (L). The following general equation expresses this effective lead as a function of the variables in the system.

$$L = L_\text{L} + \frac{D_\text{L}}{D_\text{R}} L_\text{R}$$

wherein:

$L_\text{L}$=the lead of the lead screw (plus (+) if right hand; minus (−) if left hand);
$L_\text{R}$=the lead of the differential roller (+ if right hand; − if left hand);
$D_\text{L}$=the diameter of the driving surface of the lead screw;
$D_\text{R}$=the diameter of the driven surface of the differential roller.

Note.—L is positive if of the right hand sense and negative if of the left hand sense.

In the embodiment of the gearing mechanism shown herein, the screw threads on the lead screw and on the differential roller are single threads of the same pitch but of opposite hand, thereby making one of $L_\text{L}$ and $L_\text{R}$ positive and the other negative. Accordingly, with such an embodiment the above general equation reduces to $$L = P\left(1 - \frac{D_\text{L}}{D_\text{R}}\right)$$

wherein $P$=the pitch of the thread.

The ratio between the angular speed of the screw shaft and that of the output shaft is varied by altering the ratio $D_\text{L}/D_\text{R}$ in the above equation. In the disclosed embodiment of the gearing mechanism, the second part of the mechanism, bearing the one or more rotatable screw threaded members (differential rollers), is selectively adjusted toward and away from the axis of the screw shaft (1) automatically in response to load variation and (2) manually; the value of $D_\text{L}/D_\text{R}$ varies directly with respect to the centerline distance during such adjustment.

Brief description of the drawing

In the drawings, wherein like reference characters refer to like parts throughout the several views, FIG. 1 is a view in side elevation of a preferred embodiment of gearing mechanism in accordance with the invention, the cover plate for the side of the housing of the mechanism facing the reader having been removed, certain of the parts being shown in longitudinal vertical section, the parts of the mechanism being shown in the position which they occupy when the ratio input speed/output speed is a minimum;

FIG. 2 is a view in vertical transverse section through the gearing mechanism of FIG. 1 with the cover plate in place, the section being taken along the broken line 2—2 of FIG. 1 looking in the direction of the arrows; and FIG. 3 is an enlarged view in an axial section through the driven lead screw and one of the engaged differential rollers of the mechanism shown in FIGS. 1 and 2, the section being taken along the line 3—3 of FIG. 2 looking in the direction of the arrows, the differential roller being shown in its lowermost position relative to the lead screw, wherein the ratio input speed/output speed is at its maximum;

Description of the preferred embodiment

In FIGS. 1 and 2 the embodiment of gearing mechanism there shown is generally designated by the reference character 10. An input or drive shaft 11 for the mechanism has an outer end portion 20 at the forward end of the mechanism which is adapted to be connected to a rotatable source of power, not shown. The mechanism has an output shaft 12 which is located near the rear end of the mechanism. Shaft 12 is disposed at right angles to the shaft 11 and is adapted to be connected to an instrumentality (not shown) requiring an accurately controlled variable speed drive therefor.

Mechanism 10 has an elongated housing 14 made up of a main portion having a main vertical wall 15 with upper, lower, and end walls projecting outwardly therefrom. The housing is completed by a cover plate 16 which is secured to the upper, lower, and end walls of the main part of the housing by machine screws 18, as shown. The input shaft 11 projects through and is journalled in a bearing 21 in the upper right-hand end wall (FIG. 1) of the main part of the housing. The left-hand end of shaft 11 is journalled in a bearing 22 in the upper left-hand end wall 19 of the main part of the housing. In the embodiment shown the thrust imposed upon the shaft 11 is to the left and thus bearing 21 may be a plain journal bearing, whereas bearing 22 is a thrust bearing.

The portion of the input shaft 11 intermediate the end walls 17 and 19 in which it is journalled is provided with a thread 24 of the buttress type, the thread having lands 25 which in radial planes are of generally saw-toothed configuration. The right flank 26 of each turn of the land of thread 24 inclines radially inwardly and to the right at a large angle with respect to a plane normal to the axis of the shaft 11, whereas the left flank 27 of each land of the thread 24 inclines radially outwardly and to the right in such planes at a small angle with respect to a plane normal to the axis of the shaft 11. The outer edges 29 of the thus formed lands are sharp, as is the root 30 of the helical groove 28 between successive lands 25 of the thread 24. To prevent deflection of the threaded portion of the shaft 11 upwardly by reason of its engagement with the differential rollers 49, to be described, there is provided an elongated circular cylindrical back-up roller 31 which is journalled in the housing 14 parallel to and centrally above the shaft 11. The roll 31, which is supported in bearings 32 in the housing walls 17 and 19, is of such diameter as to engage the outer edge 29 of each of the lands of the thread 24 in the vertical plane through the axes of the shaft 11 and the roll 31.

The output shaft 12 is journalled in similar bearings 34 mounted in the wall 15 of the housing and the cover plate 16 therefor, as shown in FIG. 2, the shaft 12 being disposed substantially beneath the rear or left-hand end of the thread 24 on shaft 11 (FIG. 1). Secured to the shaft 12 within the cavity in the housing is a sprocket 35 having a plurality of equally angularly spaced teeth 42 thereon separated by grooves or valleys 44. A similar sprocket 37 likewise having teeth 42 separated by grooves 44 is mounted upon an idle shaft 36 which is journalled in bearings in the housing, generally below the forward or right-hand end of the thread 24, similarly to shaft 12. Entrained over the sprockets 35 and 37 is a chain 39 which is made up of a series of main, central links 40 and intermediate outer links 41 disposed on each side of links 40, the links being pivotally connected by pintle pins 45. The length of the links 41 and the width of the links 40 are such as to present spaces between confronting ends of the links 40 which accurately receive the teeth 42 on the sprockets, the links 40 being received in the grooves 44 in the sprockets. It will thus be seen that as the chain 39 travels longitudinally it drives the sprocket 35 and the output shaft 12 on which such sprocket is mounted. In its upper, operative run the chain travels forwardly, that is, from left to right.

The main central links 40 of the chain 39 have a longitudinally extending body or base portion 47 which is in the shape of a broad V which is inverted when the links lie in the operative run of the chain, shown at the top in FIG. 2. The base portion 47 is provided at its ends with upstanding parallel arms 46 between which there are journalled in parallel relationship two similar short threaded differential rollers 49 which are symmetrically disposed on opposite sides of the vertical central plane of the lead screw. The thread on each of the differential rollers is of the same pitch as but of opposite hand from that of thread 24. The thread on each of the differential rollers has lands and grooves which, when the rollers are disposed in their upper operative positions in the driving zone of the mechanism, are generally complementary to those of the thread 24. Thus the land 50 of the thread of each of the differential rollers has a trailing flank 51 which, when the differential rollers are disposed at the top of the chain in FIGS. 1 and 2, inclines radially outwardly and forwardly (to the right) in axial planes. The leading flank 52 of the thread on the differential rollers when the rollers are disposed in such position incline radially outwardly and rearwardly. Such thread has a sharp root 54 between lands, and the outer edges 55 of the lands are sharp. Driving engagement between the threads 24 on the lead screw and the threads on the differential rollers 49 takes place only between the edges 55 of the lands on the differential rollers and the right-hand flanks 26 of the lands on the lead screw. This follows from the fact that the flanks 51 of the lands on the differential roller are inclined relative to the axis of each such roller at an angle which somewhat exceeds the angle at which the flanks 26 of the lands on the lead screw are inclined relative to the axis of the lead screw.

When substantially no load is imposed upon the output shaft 12, the differential rollers 49 lie in the position shown in FIG. 1 with respect to the thread 24 on shaft 11. Thus the lands 50 of the threads on the differential rollers are deeply intermeshed with the lands of the thread 24, the edges 55 of the lands on the threads on the differential rollers engaging the flanks 26 of the thread 24 adjacent their roots. In such position of the differential rollers relative to the lead screw, the speed of the output shaft 12 is a maximum.

The differential rollers which are disposed in the upper run of the chain and operatively engage the thread 24 are constantly urged upwardly by a pressure plate 56 having a flat upper surface along which the then lower surfaces of the bodies 47 of the central links 40 slide.

Plate 56 is thrust upwardly by a plurality of plungers 57 (two shown), the plungers being slidable in vertical main bores in a boss 59 projecting forwardly from the rear wall 15 of the housing. The plungers 57 are provided with lower coaxial pilot pin portions 60 of reduced diameter, the lower ends of pin portions 60 being accurately slidably received in lower bores of reduced diameter in boss 59. A coil compression spring 62 is disposed about each pilot pin, such spring acting between the lower end of the main bore in the boss and the transverse shoulder 61 between the upper end of the pilot pin and the body of the plunger 57.

The imposition of opposing torque upon the shaft 12 retards the chain 39, which is driven by the described driving engagement between the thread 24 on shaft 11 and the thread on each of the differential rollers 49 which is then operatively engaged with the thread 24. The described configurations of the threads on the shaft 11 and on the differential rollers 49 are such that opposition to the travel of the chain 39 causes the flanks 51 of the lands on the differential rollers to slide or be cammed down the flanks 27 of the lands of the thread on the lead screw, thereby causing the upper operative run of the chain to move downwardly away from the axis of the shaft 11. The rollers 49 are shown in their lower terminal position in FIG. 3, such position being determined by engagement of the lower surface of the pressure plate 56 with the upper surface of the boss 59. In such lower terminal position of the rollers 49, the radii of the zones of the lead screw and the differential rollers which are in driving engagement are equal, whereby the speed of the output shaft 12 is zero.

The springs 62 have such compression characteristics that the pressure plate 56 and thus the upper operative run of the chain 39 move downwardly upon the subjection of the output shaft 12 to substantial opposing torque, the extent of such movement bearing a predetermined relationship to such torque. When the shaft 12 is substantially unloaded, its speed is at a maximum by reason of the fact that the upper operative run of the chain 39 lies at its uppermost position and the ratio $D_L/D_R$ is at a minimum. As the upper operative run of the chain moves downwardly and thus the edges 55 of the lands on the operative differential rollers move outwardly along flanks 26 away from the axis of the shaft 11, such ratio progressively increases so that the effective lead (L) progressively decreases to zero when $D_L/D_R=1$. Thus the gearing mechanism of FIGS. 1, 2, and 3 is variable, the output speed of the mechanism being automatically variable from the predetermined maximum speed to a predetermined minimum speed in accordance with the load imposed thereon. It is obvious that such minimum speed, which is zero with the disclosed embodiment, may be made other than zero, if desired, by the interposition of a suitable stop between the boss 59 and the pressure plate 56.

Although only a single embodiment of the invention has been illustrated in the accompanying drawings and described in the foregoing specification, it is to be especially understood that various changes, such as in the relative dimensions of the parts, materials used, and the like, as well as the suggested manner of use of the apparatus of the invention, may be made therein without departing from the spirit and scope of the invention, as will now be apparent to those skilled in the art.

I claim:

1. A differential gearing mechanism for converting rotary motion to rotary motion, comprising two members of which one is a lead screw and the other of which is a differential roller, the lead screw and the differential roller having screw threads of substantially the same pitch thereon, the two members being disposed with parts thereof in side-by-side relationship, means mounting the lead screw and the differential roller for rotation about their respective axes, said last named means being so constructed and arranged as to permit relative movement of said parts of the differential roller and the lead screw in a direction generally along the axis of the lead screw, driving means for rotating one of said members about its axis, each of said screw threads having alternating helical lands and grooves, serially connected means including driving portions of the screw threads for drivingly connecting the two members for joint rotation about their respective axes, whereby upon rotation of the driven member the said parts of the two members travel generally axially with respect to each other at a speed which is substantially a function of the instantaneous ratio between the effective diameters of the portions of thet screw threads on said two members which are in driving relationship with each other, and means including a rotatable output shaft drivingly connected to the means mounting one of said members for converting the linear movement of the two members with respect to each other into rotary motion.

2. A mechanism as claimed in claim 1, comprising means for varying the effective diameter of at least one of the driving portions of the two members whereby to change the ratio of the speed of rotation of the lead screw and the output shaft.

3. A mechanism as claimed in claim 1, wherein the mounting means for the lead screw restrains it from axial movement, and the means for translating the linear movement of the two members with respect to each other into rotary motion further comprises an elongated flexible member disposed with a run thereof parallel to the axis of the lead screw, said elongated flexible member having a plurality of serially connected elements, the means rotatably mounting the differential roller being mounted on one of said elements, and rotatable means synchronously connecting said run of the elongated flexible member to said output shaft.

4. A mechanism as claimed in claim 1, wherein the threads on the two members are of opposite hand, and the two screw threads are drivingly engaged in meshing relationship with the lands on one member disposed within the grooves on the other member.

5. A mechanism as claimed in claim 4, wherein corresponding radially outer edges of the lands of the thread on one member drivingly engage the corresponding confronting sides of the lands on the other member at locations spaced radially outwardly from the roots of the grooves of the thread on said other member.

6. A mechanism as claimed in claim 1, wherein the gearing mechanism is variable, and comprising means for varying the ratio of the diameters of the portions of the two members which are in driving relationship with each other, said last named means including means for varying the distance between the axes of the lead screw and the differential roller.

7. A mechanism as claimed in claim 6, wherein the mounting means for the lead screw restrains it from axial movement, and the means for converting the linear movement of the differential roller along the lead screw into rotary motion further comprises an elongated flexible member disposed with a run thereof parallel to the axis of the lead screw, said elongated flexible member having a plurality of serially connected elements, the means rotatably mounting the differential roller being mounted on one of said elements, and rotatable means synchronously connecting said run of the elongated flexible member to said output shaft.

8. A mechanism as claimed in claim 7, wherein said elongated flexible member is endless, and comprising a further rotatable means spaced from and aligned with said first recited rotatable means, said elongated flexible member being entrained over said two rotatable means, and wherein the means for varying the distance between the axes of the lead screw and the differential roller comprises means for varying the spacing between said run of the elongated flexible member and the axis of the lead screw.

9. A mechanism as claimed in claim 8, wherein the means for varying the spacing between the said run of the elongated flexible member and the axis of the lead screw comprises a pressure shoe underlying the portion of the said run of the elongated flexible member which lies parallel to the axis of the lead screw, and means for varying the spacing of the pressure shoe and the said run of the elongated flexible member which overlies the pressure shoe from the lead screw.

References Cited

UNITED STATES PATENTS

| 2,131,261 | 9/1938 | Aldeen et al. | 74—424.6 |
| 3,165,007 | 1/1965 | Neubarth | 74—424.8 |
| 3,295,385 | 1/1967 | Jenny | 74—424.8 |

FRED C. MATTERN, Jr., *Primary Examiner.*

LEONARD H. GUERIN, *Assistant Examiner.*

U.S. DEPARTMENT OF COMMERCE

PATENT OFFICE

Washington, D.C. 20231

UNITED STATES PATENT OFFICE
CERTIFICATE OF CORRECTION

Patent No. 3,402,618            September 24, 1968

William J. Roantree

It is certified that error appears in the above identified patent and that said Letters Patent are hereby corrected as shown below:

In the drawings, cancel sheet 2 containing figures 3 to 5. In the heading to the drawing, sheet 1, line 3, cancel "2 Sheets-Sheet 1".

Signed and sealed this 3rd day of February 1970.

(SEAL)
Attest:

Edward M. Fletcher, Jr.            WILLIAM E. SCHUYLER, JR.
Attesting Officer                    Commissioner of Patents